US008159971B2

(12) United States Patent
Singh et al.

(10) Patent No.: US 8,159,971 B2
(45) Date of Patent: Apr. 17, 2012

(54) SYSTEM AND METHOD FOR INFERRING CONNECTIVITY AMONG NETWORK SEGMENTS IN THE ABSENCE OF CONFIGURATION INFORMATION

(75) Inventors: Pradeep K. Singh, Arlington, VA (US); Venuprakash Barathan, Jersey City, NJ (US)

(73) Assignee: OPNET Technologies, Inc., Bethesda, MD (US)

( * ) Notice: Subject to any disclaimer, the term of this patent is extended or adjusted under 35 U.S.C. 154(b) by 233 days.

(21) Appl. No.: 11/844,765

(22) Filed: Aug. 24, 2007

(65) Prior Publication Data
US 2008/0049645 A1 Feb. 28, 2008

Related U.S. Application Data

(60) Provisional application No. 60/823,593, filed on Aug. 25, 2006.

(51) Int. Cl.
*H04L 12/28* (2006.01)
*G06F 15/173* (2006.01)

(52) U.S. Cl. ........ 370/254; 370/255; 709/220; 709/221; 709/223; 709/228

(58) Field of Classification Search .......... 370/254–255; 709/220, 221, 223, 224, 227, 228
See application file for complete search history.

(56) References Cited

U.S. PATENT DOCUMENTS

| | | | | |
|---|---|---|---|---|
| 5,437,015 A * | 7/1995 | Iki | ................................. | 709/221 |
| 5,889,954 A * | 3/1999 | Gessel et al. | ................... | 709/223 |
| 6,654,802 B1 * | 11/2003 | Oliva et al. | .................... | 709/224 |
| 7,225,117 B1 * | 5/2007 | Feldstein et al. | ................ | 703/21 |
| 7,317,693 B1 * | 1/2008 | Roesch et al. | ................. | 370/252 |
| 7,496,662 B1 * | 2/2009 | Roesch et al. | ................. | 709/224 |
| 7,552,201 B2 * | 6/2009 | Areddu et al. | ................. | 709/220 |
| 7,660,256 B2 * | 2/2010 | Nagami et al. | ................ | 370/241 |
| 7,848,259 B2 * | 12/2010 | Gray et al. | .................... | 370/255 |
| 2002/0003548 A1 * | 1/2002 | Krusche et al. | ............... | 345/736 |
| 2002/0021675 A1 * | 2/2002 | Feldmann | ...................... | 370/254 |
| 2003/0035399 A1 * | 2/2003 | Ishibashi et al. | ............... | 370/338 |
| 2003/0091165 A1 * | 5/2003 | Bearden et al. | ............ | 379/88.08 |
| 2003/0145078 A1 * | 7/2003 | Hubbard | ........................ | 709/224 |
| 2003/0189919 A1 * | 10/2003 | Gupta et al. | ................... | 370/351 |
| 2004/0030771 A1 * | 2/2004 | Strassner | ....................... | 709/224 |
| 2004/0172412 A1 * | 9/2004 | Files et al. | ................. | 707/104.1 |
| 2004/0196865 A1 * | 10/2004 | Natarajan et al. | ............. | 370/465 |
| 2005/0091482 A1 * | 4/2005 | Gray et al. | .................... | 713/151 |
| 2005/0108379 A1 * | 5/2005 | Gray et al. | .................... | 709/223 |

(Continued)

FOREIGN PATENT DOCUMENTS

| | | | |
|---|---|---|---|
| WO | WO 2004/010631 A | 1/2004 | |
| WO | WO 2004/010631 A2 | 1/2004 | |

*Primary Examiner* — Aung S Moe
*Assistant Examiner* — Benjamin H Elliott, IV
(74) *Attorney, Agent, or Firm* — Robert M. McDermott

(57) ABSTRACT

The present system includes a system, method and device for inferring connectivity between unconnected network segments. In operation, unconnected network segments are identified. Configuration data related to the unconnected network segments may be examined to facilitate inferring configuration data for an external network connected between the unconnected network segments. The inferred configuration data may be rendered, such as exported or visualized. The inferred configuration data may be related to a communication protocol and/or may be related to network bandwidth. The examined configuration data may be captured directly from one or more of the unconnected network segments and/or may be retrieved from a configuration data file, such as a network configuration model.

25 Claims, 11 Drawing Sheets

U.S. PATENT DOCUMENTS

2005/0125492 A1 6/2005 Yu et al.
2005/0233750 A1* 10/2005 Pirrone .......................... 455/446
2007/0201384 A1* 8/2007 Cunningham et al. ........ 370/254
2008/0267187 A1* 10/2008 Kulmala et al. ............... 370/392

* cited by examiner

SYSTEM AND METHOD FOR INFERRING CONNECTIVITY AMONG NETWORK SEGMENTS IN THE ABSENCE OF CONFIGURATION INFORMATION

This application claims the benefit of U.S. Provisional Patent Application No. 60/823,593, filed Aug. 25, 2006.

BACKGROUND AND SUMMARY OF THE INVENTION

The present system relates to the field of network troubleshooting and analysis and particularly to a system and method for inferring connectivity among external networks, in some cases in the absence of configuration information.

In the field of network performance analysis, it is often desirable to evaluate a current state of network health or to predict future network behavior. For comprehensive network analysis, it is important to have at least some portion of a physical description of a connected network. However, often there are cases where network segments are managed by parties other than the party that is performing the network analysis. In other cases where network segments are managed by a single party (e.g., enterprise or service provider), often the segments are interconnected via one or more external networks so again it is not possible to build a sufficient description of a physical connection between those managed segments, for example, due to a lack of configuration information for the external networks. In such cases, for any type of analysis involving an inter-site network activity that involves a network segment where details on the segment are not available, there needs to be some type of abstraction to represent a configuration of the external network segments that connect to a current user's network segments.

It would be advantageous to overcome the disadvantages and/or make improvements in the prior art. Through operation of an embodiment of the present system, a method is provided to create an abstract representation of external networks, thereby providing a connected network topology when desired.

The present system includes a system, method and device for inferring connectivity between unconnected network segments. In operation, unconnected network segments are identified. Configuration data related to the unconnected network segments may be examined to facilitate inferring configuration data for an external network connected between the unconnected network segments. The inferred configuration data may be rendered. The inferred configuration data may be related to a communication protocol, such as Internet Protocol (IP), Open Shortest Path First (OSPF), Enhanced Interior Gateway Routing Protocol (EIGRP), and Border Gateway Protocol (BGP). In one embodiment, the inferred configuration data may be related to network bandwidth.

The rendering may include exporting the inferred configuration data to a network model. The rendering may include visually depicting the inferred configuration data. In rendering the configuration data, a network model may be altered to include one or more additional elements that are representative of at least a portion of the external network. The examined configuration data may be related to one or more of the unconnected network segments, may be captured directly from one or more of the unconnected network segments and/or may be retrieved from a configuration data file, such as a network configuration model.

Inferring configuration data may include an automated activity and/or a manual activity. Inferring configuration data may include a step-wise process for interaction with a user. The step-wise process may be arranged to prompt the user to make the inference. A user interface (UI), for example such as a graphical user interface (GUI) may be generated to facilitate user interaction. The UI may be arranged having a first portion related to inferring the configuration data and a second portion related to associated help. In one embodiment, each of the portions may be depicted simultaneously within the UI.

BRIEF DESCRIPTION OF THE DRAWINGS

The invention is explained in further detail, and by way of example, with reference to the accompanying drawings wherein.

DETAILED DESCRIPTION

Figure 1:
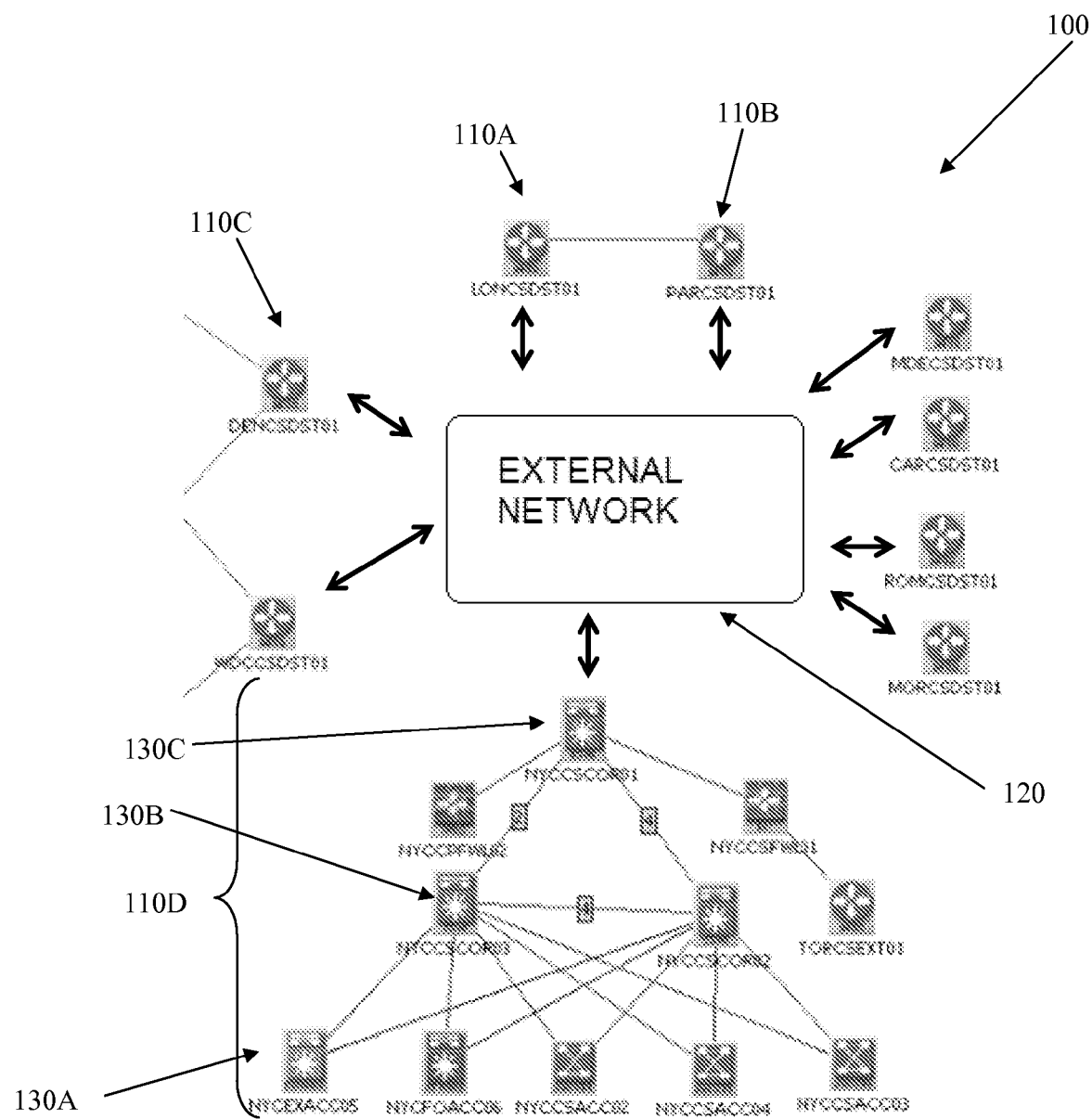
FIG. 1 shows a network configuration including an illustrative set of unconnected network segments that are connected together through an external network.

The following are descriptions of illustrative embodiments that when taken in conjunction with the following drawings will demonstrate the above noted features and advantages, as well as further ones. In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims. Moreover, for the purpose of clarity, detailed descriptions of well-known devices, circuits, and methods are omitted so as not to obscure the description of the present system.

It should be expressly understood that the drawings are included for illustrative purposes and do not represent the scope of the present system. In the drawings, a first part of an element's reference number typically corresponds to the drawing number in which the element appears.

The system and method described herein address problems in prior art systems. The present system is directed towards inferring configuration data describing a physical configuration including a description of connectivity between network segments. In one embodiment, the network segments connect via one or more external networks. In some cases, the present system may be employed to provide a description of the connectivity between geographically and/or physically dispersed sites connecting via one or more external networks, although geographical and/or physical dispersion is not a requirement of the present system. For example, in a given network, if desired, two devices may be sitting next to each other providing neither geographical nor physical dispersion yet may be connected together via an external network. Further, illustratively the present system is described within a context of building configuration data of connected networks for network planning studies although an intended use of the present system is not intended as a limitation to the present system unless specifically stated otherwise. Other uses of the present system would readily occur to a person of ordinary skill in the art and are intended to fall within the scope of the present system.

To facilitate the following discussion, for purposes of simplifying a description, the term "external network" as utilized herein is intended in one embodiment to refer to a network segment that is not completely described prior to operation in accordance with the present system. An external network may be a network that is managed by a third party and which a user of the present system has no knowledge of regarding portions of one or more of network properties, internal connectivity, and external connection interfaces. Thereby, the external network may simply be a network segment of which the user has incomplete knowledge. The term "external network" as utilized herein is intended in another embodiment to refer to a network segment that the user has complete knowledge of but which the user desires a simplified description to facilitate analysis of other portions (e.g., segments or portions thereof) of the network. In yet another embodiment, the term external network may be utilized to refer to little more than a physical connection between network segments. For example, an embodiment wherein an external network describes a simple physical connection (e.g., wired, wireless, infrared or other connection), modeling the connection as an external network may enable an allocation of properties to the external network. These allocated properties may be utilized to facilitate an analysis of an affect of those properties on the network segments, separate from other qualities of the network segments or may simply describe real limitations (e.g., bandwidth and/or delay) introduced by the connections. Accordingly, the term "external network" and variations thereof when utilized herein should be understood to include any one or more of the above scenarios.

The terms "unconnected network segment(s)" and/or "previously unconnected network segment(s)" as utilized herein are intended to refer to one or more network segments that are described in sufficient detail at least related to configuration data such as connectivity and/or connection interface(s), that a network analysis may be performed on those segments, at least individually, without operation of the present system. Typically, an unconnected network segment is under control and/or supervision of the user that is conducting a network analysis operation. In any event, the user at least has sufficient information about the unconnected network segment although this information may in some cases be available to the user as a result of a relationship with a third party that has the information. The unconnected and/or previously unconnected network segments may also be referred to herein as unconnected edge devices since each of the network segments interact with at least one other edge device through the external network(s). Accordingly, the terms "unconnected network segment(s)", "previously unconnected network segment(s)" and "unconnected edge device(s)" and variations thereof when utilized herein should be interchangeably understood to include any one or more of the above scenarios and descriptions thereof.

The terms "configuration", "configuration data", "configuration data file and formatives thereof as utilized herein are intended to include any data from which a network configuration may be inferred including operating capabilities such as configuration data related to a network segment. Configuration data may include one or more of connectivity information, communication protocols, bandwidth, delay, collision data, traffic, delays, collisions, housekeeping processes, etc. A "configuration data file" is utilized herein to refer to a record of a network configuration, connectivity and/or activity, such as a trace file, a network model, etc., although may include any one or more data files utilized to record network information from which network configuration data may be inferred. In another embodiment, configuration data may be captured directly from the network(s) and therefore may not previously be stored in a data file prior to operation of the present system. To simplify the following discussion, configuration data may be illustratively described as retrieved from data files, although as may be readily appreciated, embodiments wherein data is captured directly from the network may be similarly applied. The present system, including a graphical user interface for facilitating user interaction, offers a range of features and provides functionality for the user that is unavailable in prior systems.

The present system provides an ability to create a description of a connected network, that otherwise would be described as unconnected network segments, by modeling external networks. In one embodiment, the operating description of at least a portion of the external network may be inferred from information that is known, for example from a configuration data file, related to the unconnected network segments. By operation of the present system, an ability is provided to perform network behavior studies, or at least portions thereof, which require at least some continuity description of network topology. Through operation of an embodiment of the present system, a representation, abstract or otherwise, of the external network(s) may be created to provide configuration data related to the external network that provides connectivity between the previously unconnected network segments.

What is intended in the following discussion relating to network segments including external networks is that these terms should be understood to refer not only to physical network portions or potential network portions, but should also be understood to refer to configuration data such as connectivity data (e.g., both physical connectivity and requirements of connectivity such as communication protocols), activity data, etc., that describes those network portions. In one embodiment of the present system, the descriptions of network segments may be retrieved from and/or stored in one or more configuration data files. In one embodiment, the description of network segments may be loaded from a model file, configuration data may be specified by the user during creation of the model, or it may be imported directly from the network elements.

The present system will be further described by way of illustrative examples of embodiments of the present system and by reference to FIG. 1 and following figures. FIG. 1 shows a network configuration 100 including an illustrative set of unconnected network segments or edge devices, such as unconnected network segments 110A, 10B, 110C, 110D that are connected together through an external network 120. As may be readily appreciated, in some networks, a portion of an unconnected network segment (e.g., unconnected network segment 110D) may include network elements (e.g., router, switch, node, etc.) that may interact directly (e.g., network elements 130A, 130B) or may communicate through one or more other network elements within the unconnected network segment (e.g., network elements 130A, 130C that communicate together through network element 130B), without communicating through the external network 120. Further, two or more unconnected network segments may communicate together without use of the external network 120 (e.g., unconnected network segments 110A, 110B), yet each may communicate with other unconnected network segments (e.g., unconnected network segment 110C) through one or more separate connections to the external network 120. Illustratively, the network configuration 100 may belong to a single managing party (e.g., the user) and the unconnected network segments (e.g., edge devices located at user sites) may be geographically dispersed in locations such as New York, London, Paris, Morocco, Romania, etc. These edge devices may connect to each other using a variety of technologies and protocols. Typically, the party managing the edge devices does not have access to the external network's configuration information, does not have access to some portion of the external network's configuration information, or desires to model the external network for some other purpose as discussed above.

To successfully analyze the network configuration 100, a valid representation of the external network connecting the sites must be provided. As may be readily appreciated, exactly what configuration information is required may change depending on what further analysis is desired. Accordingly, exactly what constitutes a valid representation may also change as may be readily appreciated by a person of ordinary skill in the art. For example, in some cases a complete description of configuration such as throughput capability, transmission protocols, etc., may be required. In other cases it may be sufficient to merely appreciate a throughput capability or some other portion of the external network.

Figure 2:
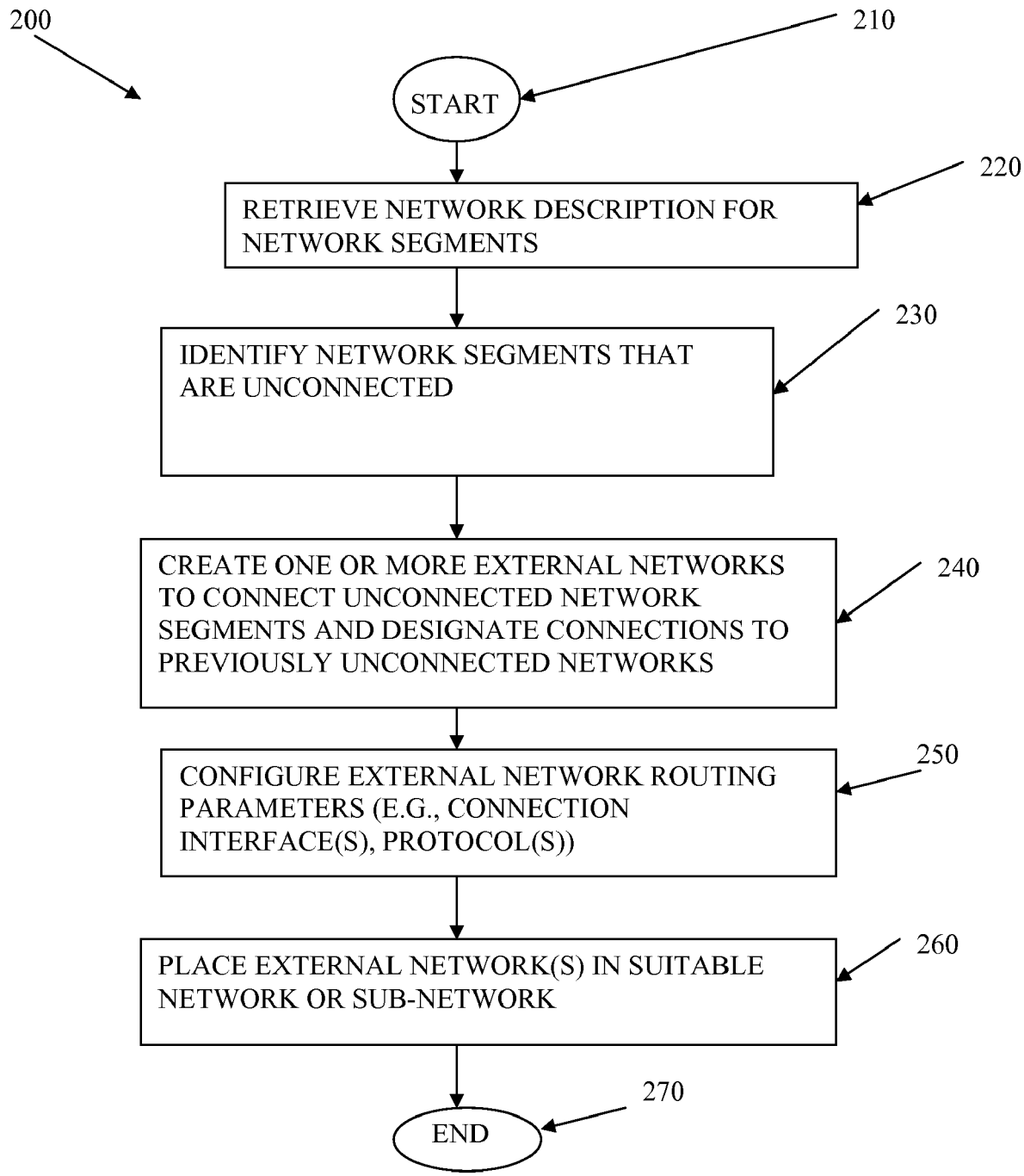
FIG. 2 shows an illustrative flow diagram of a process for determining a valid representation of an external network in accordance with an embodiment of the present system.

FIG. 2 shows an illustrative flow diagram 200 of a process for determining a valid representation of an external network in accordance with an embodiment of the present system. In one embodiment, the present process may be enacted as a stand-alone process wherein the goal is to provide a connected network description. The connected network description may thereafter be exported or imported by a further separate process for any other process (e.g., further analysis) in which it is desirable to have the connected network description. In another embodiment, the present system may be integrated into a process wherein creating the connected network description is only one portion of the process. In either event, the present system may be employed to assist in building network models for assistance in performing network analysis, network simulations, etc.

The process starts during act 210, for example, in response to a user request to create the connected description. In a further embodiment, the process may start in response to a request from another program or program portion. For example, the present system may be initiated by a configuration data file analysis tool, such as an activity data file analysis tool, in response to an uploading of one or more unconnected network segments to a network model. In operation, the network description for network segments is retrieved during act 220, for example from a configuration data file. The retrieved network segments may include unconnected network segments, external network designations, etc.

The retrieved network segments may be uploaded directly from a further system or may be available from one or more configuration data files. In practice, the network segments may be imported by the present system or may be exported to the present system by another system. In another embodiment, a portion of the configuration data, for example all of the configuration data, may be captured directly from one or more of the unconnected network segments and therefore need not be stored in a configuration data file prior to operation of the present system. However, as may be readily appreciated, even captured configuration data may be previously stored. The configuration data may be retrieved from a model file that models one or more of the unconnected network segments. Typically, the network segments include a topological description (e.g., connectivity data) of the network segments and operating characteristics of the network segments such as communication protocols, data transfer rate, capacity conditions, etc., or any portion thereof.

Figure 3:
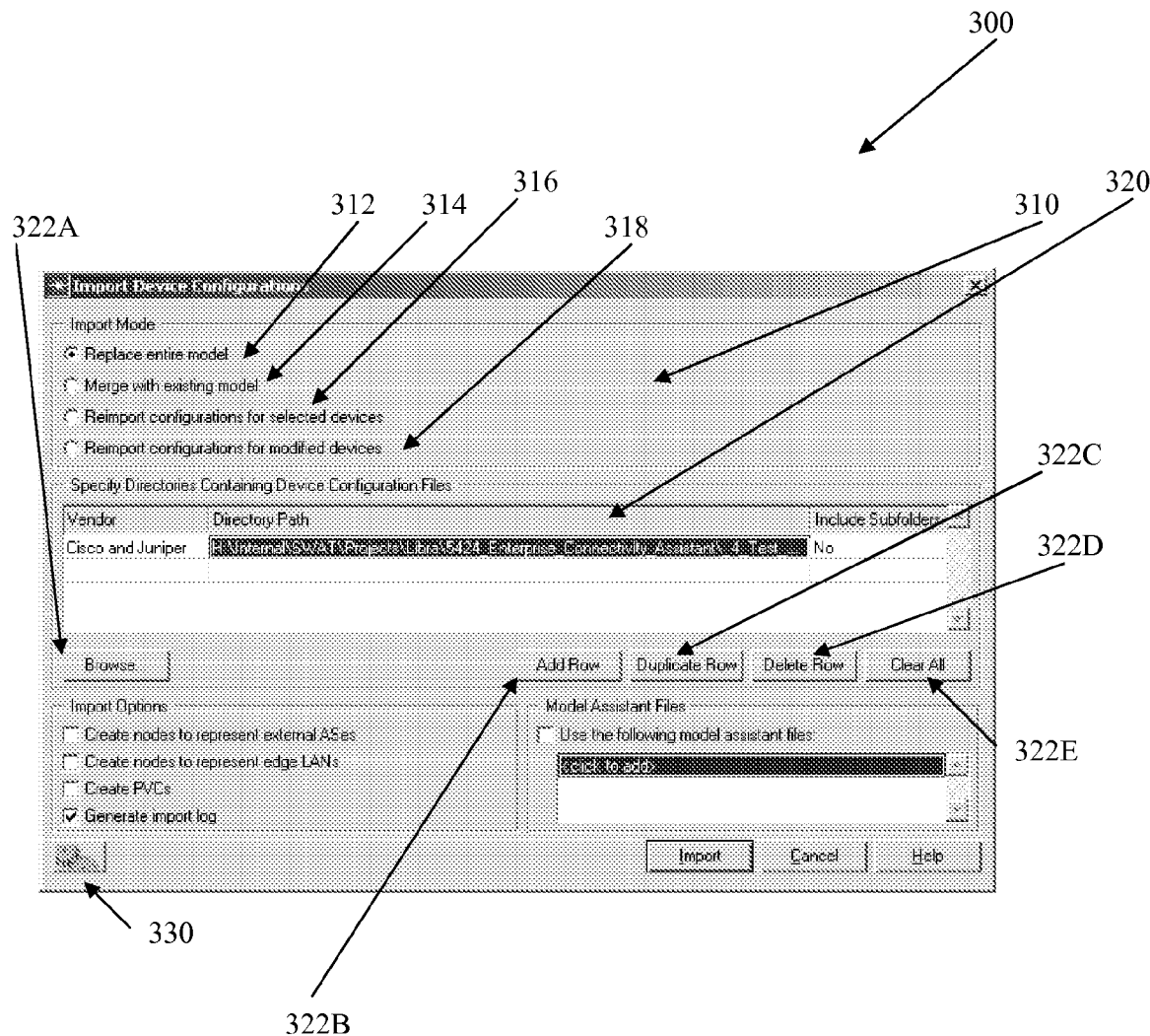
FIG. 3 shows an illustrative user interface (UI) as a graphical user interface (GUI) that may be utilized in accordance with the present system for importing data related to the network segments.

FIG. 3 shows an illustrative user interface (UI) as a graphical user interface (GUI) 300 that may be utilized in accordance with the present system for importing the network segments. Naturally another UI, such as a textual-based UI may also be suitably employed, such as a command-line argument in a command that initiates operation of the present system. The GUI 300 is illustratively depicted including a typical windowing environment. Menu items provided may be typical of those in a windowing environment, such as may be represented within a Windows™ Operating System GUI as provided by Microsoft Corporation or any other windowing environment. The objects and sections of the visualization may be navigated utilizing a user input device, such as a mouse, trackball and/or other suitable user input. The user input device may be utilized for selecting network element data files within the GUI 300 as discussed further herein. Further, the user input may be utilized for selection of menu items, radio buttons and other common interaction paradigms as understood by a person of ordinary skill in the art.

In accordance with an embodiment, the GUI 300 includes an import mode selection portion 310, such as a window pane, that lists different import modes that may be natively supported by the present system. For example, the import mode selection portion 310 may include a selection 312 to replace an entire prior network model, a selection 314 to merge results of current operations with an existing model, a selection 316 to re-import configurations for selected devices (e.g., edge devices and/or portions thereof), and/or a selection 318 to re-import configurations for modified devices. As may be apparent, all or any portion of a network configuration description may be retrieved/provided, for example from/to one or more configuration data files.

A portion 320 of the GUI 300 may be utilized to identify/specify data files, directories, sub-directories, etc., that contain network segment configuration data and portions thereof, for example including device configurations of the network segments. In one embodiment, each unconnected network segment configuration may be contained in separate data files that may be specified in the portion 320. In another embodiment, two or more unconnected network segment configurations may be contained in a given data file. The portion 320 may further include one or more of navigation buttons 322A-322E for adding/deleting/editing directories where data files are contained. Other buttons within the GUI 300 may also be provided including a settings button 330 for adjusting one or more settings of the present system as may be readily appreciated. For example, a setting may affect what portions of network segment configuration data to upload. In one embodiment, based on selections within import mode selection portion 310, different directory selection options may be provided within the portion 320.

A valid representation of the network configuration including unconnected network segment(s) and external network(s) is provided in accordance with the present system in a way that enables the user to specify characteristics of the external network(s) in abstract terms, which then may be translated to correct network elements and configurations representing the external network. Returning to FIG. 2, during act 230, network segments may be identified, for example, as unconnected network segment(s), external networks(s), etc. In accordance with one embodiment of the present system, the identification may occur as a result of an automated analysis of the retrieved network segment data. In another embodiment, the identification may be a manual process performed by the user and/or the user may review/edit results of the automated process.

In accordance with an embodiment of the present system, an automatic identification of network segments may be made based on data gathered from configuration data files for the edge devices and/or based on diagnostic information on the network elements, such as Internet Protocol (IP) forwarding tables.

Figure 4:
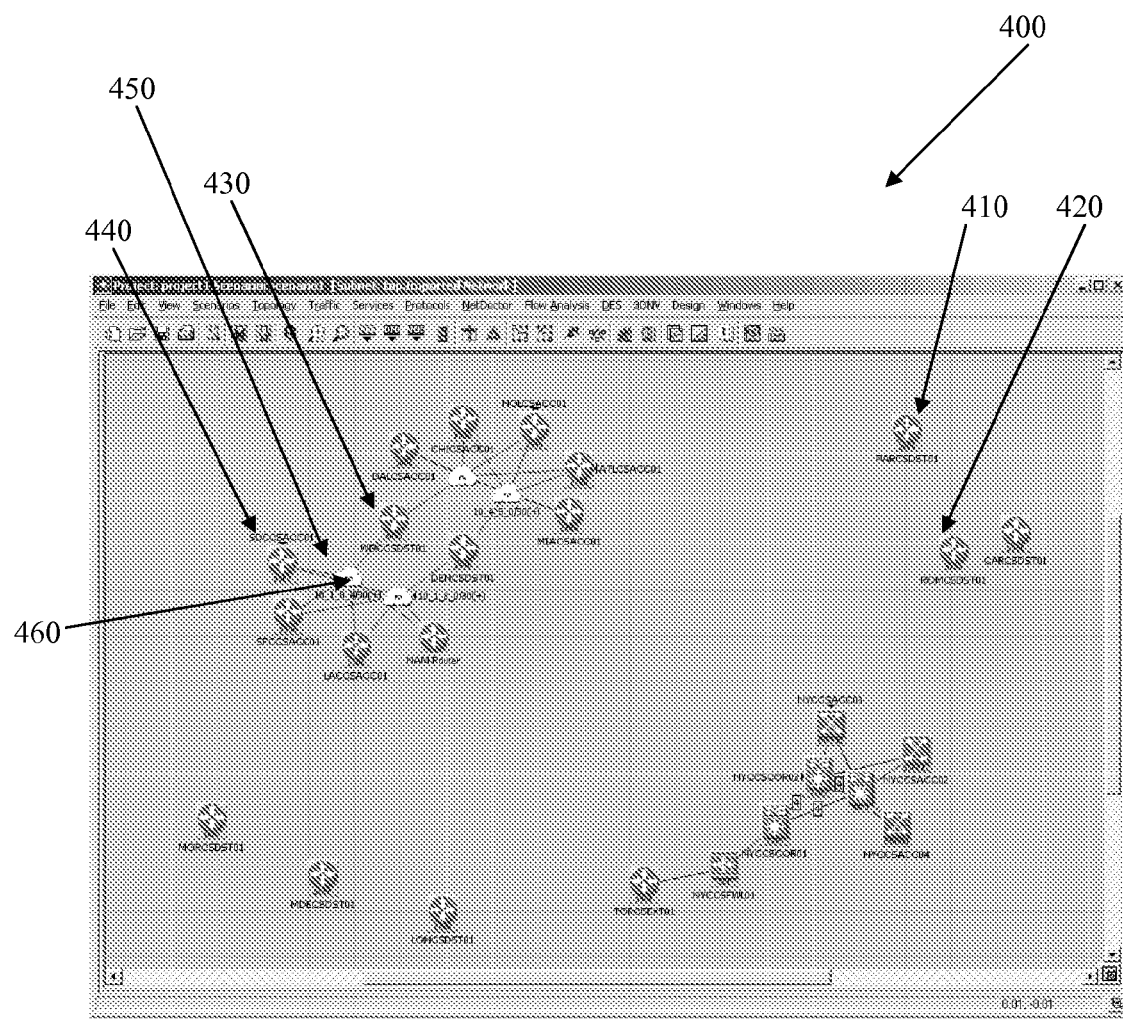
FIG. 4 shows an illustrative GUI that may be utilized in accordance with the present system for identifying/reviewing/editing designations (e.g., unconnected) and/or configurations of network segments.

FIG. 4 shows an illustrative GUI 400 that may be utilized in accordance with the present system for identifying/reviewing/editing designations (e.g., unconnected) and/or configurations of network segments. The identifying/reviewing/editing may be performed by assigning a special role to managed network segments, may be performed individually, for example by selecting segments from the GUI 400, and/or may be performed on groups of network segments or portions thereof. For example, left-clicking on a network segment may expand details of the network segment that may be selected for use with the present system, for example, optionally not selecting other portions of the network segment. Selection of a toolbar option may enable a designation of an external network and/or a configuration designation of the external network. The GUI 400 illustratively shows unconnected network segments, 410, 420, as well as previously unconnected network segments, such as previously unconnected network segments 430, 440, shown connected at least to each other by an external network 450. Iconic visualizations of network segments may facilitate a ready identification of whether a network segment is an unconnected network segment, a previously unconnected network segment, an external network, or any portions thereof. For example, a cloud visualization, such as a cloud visualization 460 may be depicted to designate the external network(s), such as the external network 450. Other visual metaphors would readily occur to a person of ordinary skill in the art and are intended to be encompassed by the present system although are not required by the present system unless stated otherwise. Naturally, the GUI 400 may be provided to enable a visualization, such as a review, of network segments.

Figure 5:
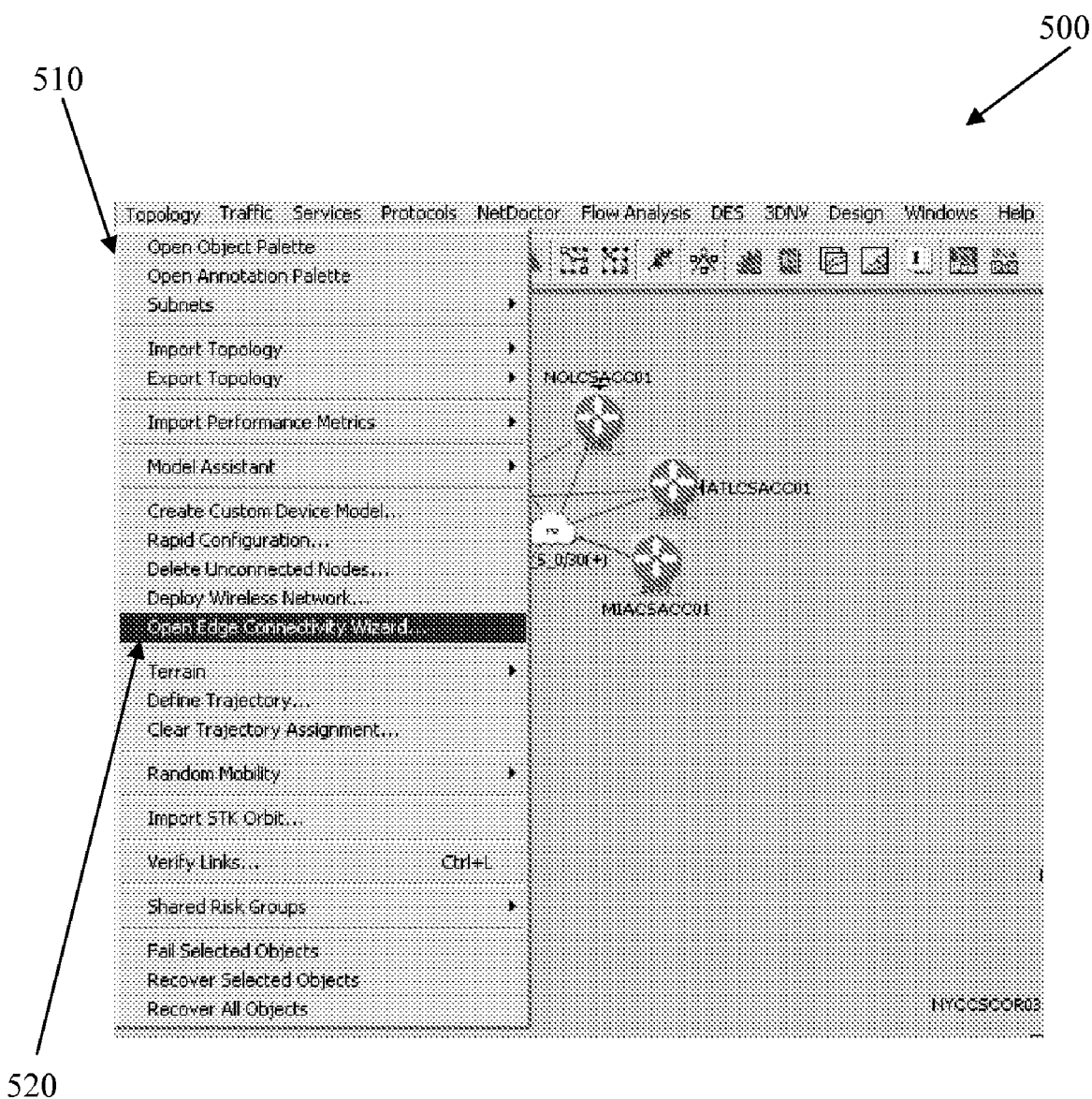
FIG. 5 shows an illustrative GUI that may be utilized for selecting a step-wise process in accordance with an embodiment of the present system.

In one embodiment, the designation and/or configuration of the external network may be facilitated through a guided step-wise process. FIG. 5 shows an illustrative GUI 500 that may be utilized for selecting a step-wise process in accordance with an embodiment of the present system. In this embodiment, selection of a toolbar option related to topology initiates a visualization of a pop-up window 510 containing menu items related to network topology, for example, including the step-wise process, as illustratively visualized as a highlighted menu item 520. Selection of the menu item 520, for example through use of a left mouse click as readily understood, may initiate the step-wise process.

Figure 6:
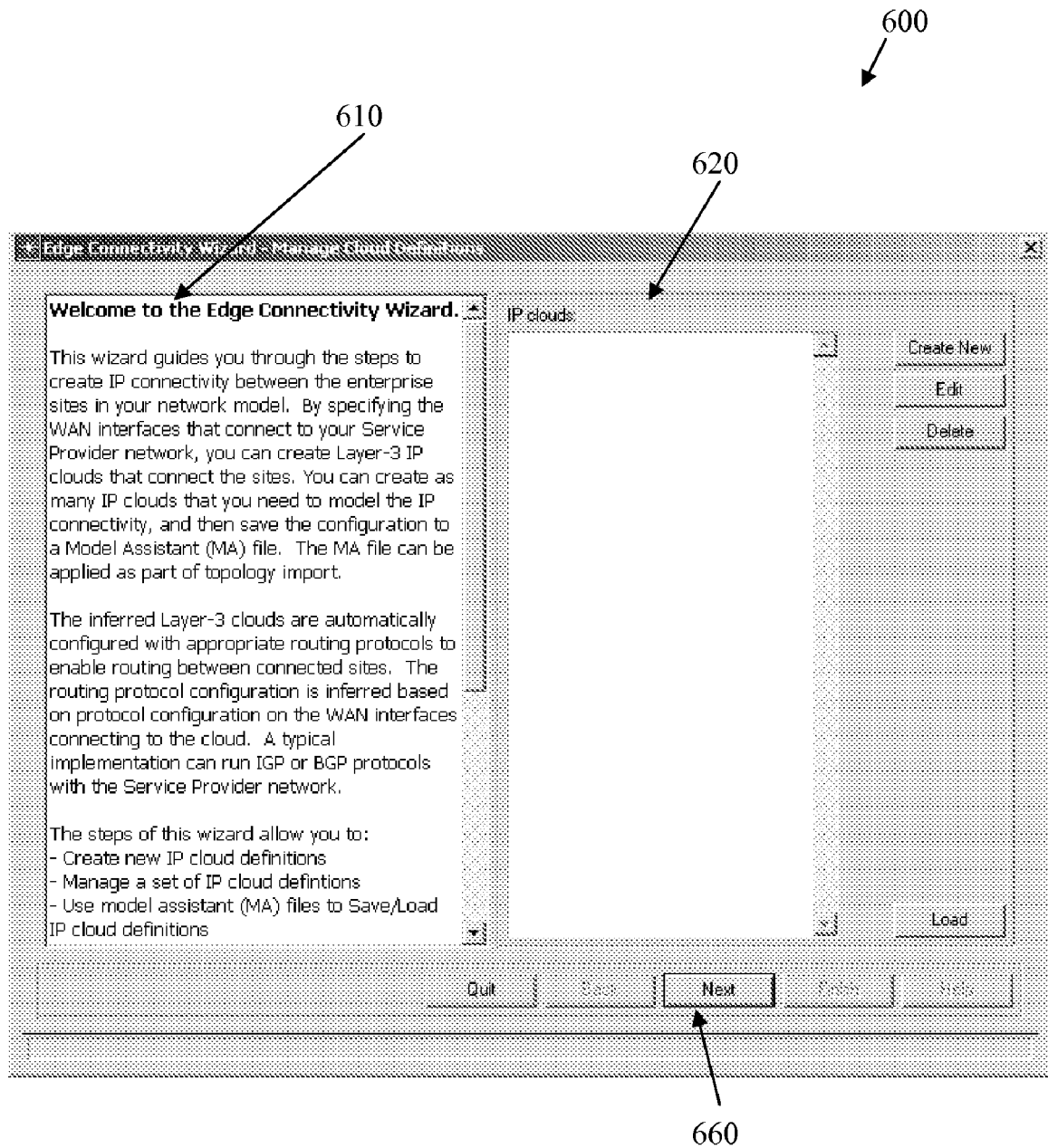
FIG. 6 shows an illustrative GUI that may be initiated in response to selection of a step-wise operation in accordance with an embodiment of the present system.

FIG. 6 shows an illustrative GUI 600 that may be initiated in response to selection of the menu item 520 in accordance with an embodiment of the present system. The GUI 600 is illustratively divided into a help portion 610 and an activity section 620. In accordance with an embodiment of the present system, the help section 610 may provide contextual help related to a currently selected portion of the present process. In accordance with an embodiment, the activity section 620 may be provided to visualize the currently selected portion of the present process. The GUI 600 may enable a step-wise process to create connectivity between unconnected network segments. In one embodiment, the description of external networks (e.g., network layer or layer-3 descriptions of the external networks) may be automatically configured, for example, including routing protocols to enable an inference of configuration data related to one or more communication paths between unconnected network segments. As indicated, in one embodiment the routing protocol configuration may be inferred based on protocol configurations of the unconnected network segments. Within the illustrative GUI 600, the routing protocol configuration of external networks may be created, edited and/or deleted. In response to selection of a create or edit button within the GUI 600, for example during one or more of acts 240, 250 of FIG. 2, an editing GUI 700 may be provided as illustratively depicted in FIG. 7.

Figure 7:
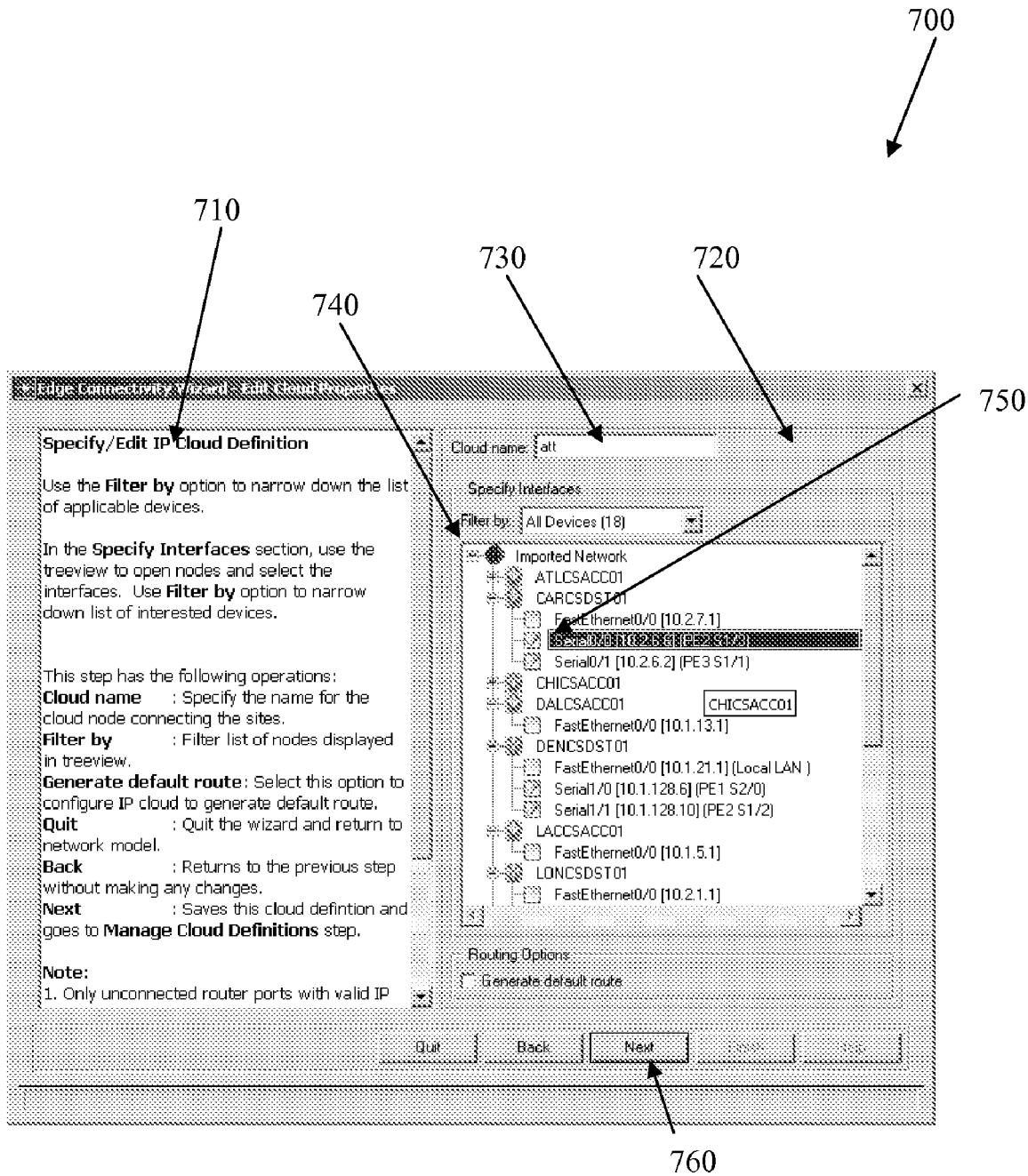
FIG. 7 shows an illustrative GUI that may be initiated in response to selection of an editing function in accordance with an embodiment of the present system.
Figure 8:
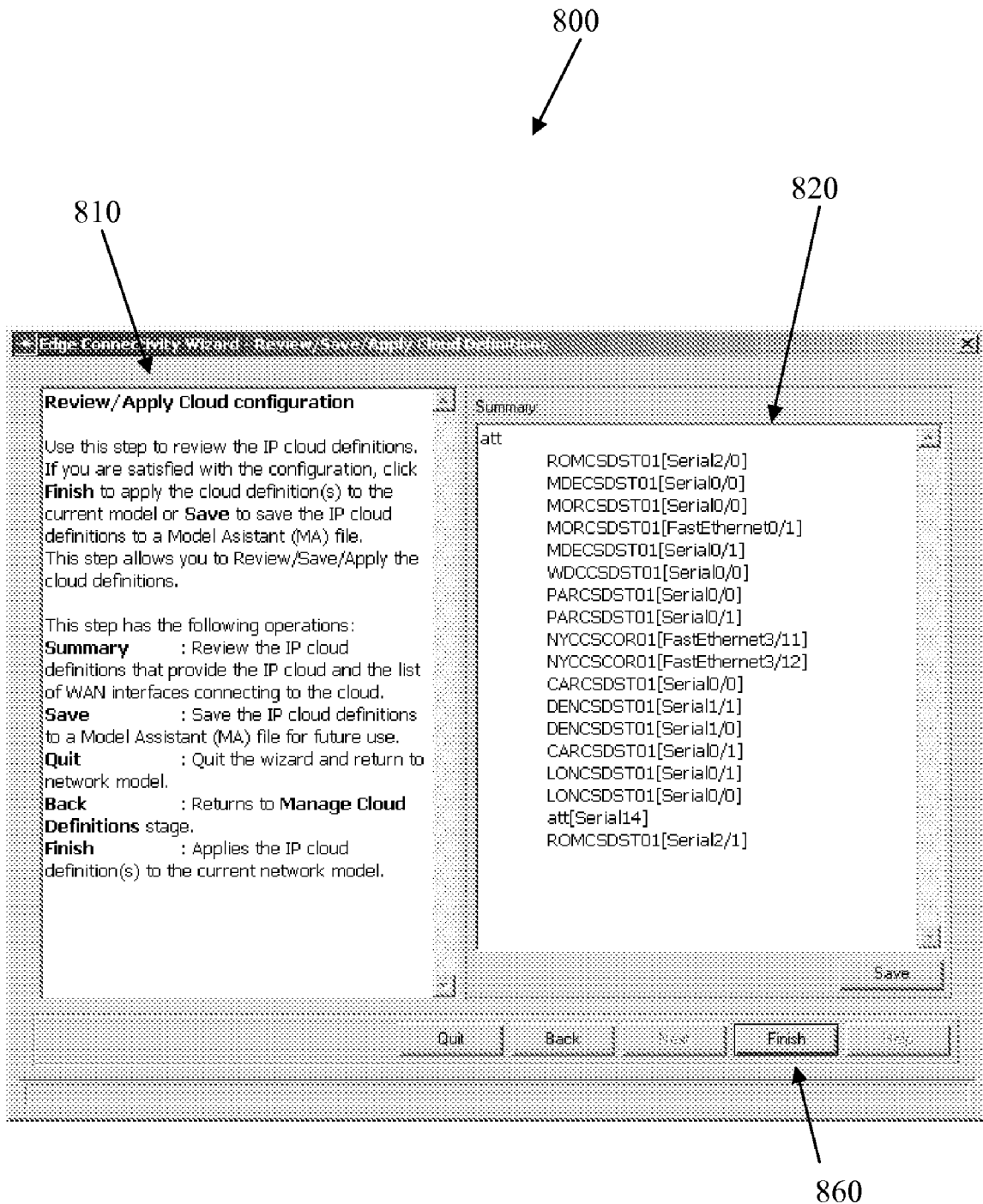
FIG. 8 shows an interface for the user to review a summary of the external networks and the configuration information that are associated with the external networks in accordance with an embodiment of the present system.

FIG. 7 shows a GUI 700 that is provided in a similar form as GUI 600 including being divided into a help portion 710 and an activity section 720. In accordance with an embodiment of the present system, two or more interfaces within the step-wise process, such as GUI's 600, 700, 800 (see, FIG. 8) may be provided with a similar "look and feel" to facilitate a familiarity of a user with the interface of the present system. The GUI 700 illustratively provides the user with an ability to name an external network (e.g., entry box 730), specify unconnected network segments or portions thereof to connect to the external network and specify level 3 communication protocols and routing connections, bandwidth limitation, etc., for the external network. As may be readily appreciated, the user does not need to specify any protocol or other information. In one embodiment, configuration data is inferred based on the selected interfaces of the network segments. Through operation of the GUI 700, the user may use known information concerning the unconnected network segments to create an abstract representation of the external network and/or to make inferences (manually, automatically or a combination thereof) based on previously unconnected network segments that are selected to be connected to the external network during the acts 240, 250 of FIG. 2.

The portion 720 may include a visual depiction of a network topology illustratively shown in the GUI 700 as a tree view topology 740. Plus and/or minus selection boxes may be provided to enable a view respectively of more or less details of the tree view topology 740 as may be readily appreciated by a person of ordinary skill in the art. Illustratively, the tree view topology 740 is shown sorted alphabetically based on the nomenclature utilized for specifying the unconnected network segments. As may be readily appreciated, clearly other systems for organizing the network topology may be readily applied, such as topological groupings based on geographic locations of the unconnected networks. A hierarchy may also be visually depicted to enable a ready association between the unconnected network segments and configuration details of the unconnected network segments.

In accordance with an embodiment of the present system, the present system may use the configuration information relating to the unconnected network segments to create (e.g., automatically) and/or facilitate (e.g., manually) an inference of an abstract representation of the external network. In an automatic implementation, the configuration information for the network elements in the external network is automatically inferred based on the configuration of previously unconnected network segments that are selected to connect to the external network. For example, configuration information of the external network may automatically be selected to comply with one or more portions of the configuration information (e.g., inter-network delays, loading, communication protocols, etc.) of the previously unconnected network segments.

For example, the inferred configuration information may include, but is not limited to, one or more of physical layer technology, operating speed and layer-3 routing protocols (e.g., OSPF, EIGRP, BGP, etc.). In one embodiment of the present system, the inferred configuration information may be guaranteed to be consistent with one or more portions (e.g., all) of the configuration information of the previously unconnected network segments to ensure a complete description of communication between the previously unconnected network segments (e.g., managed sites).

For example, in an automatic inference of configuration information, such as communication protocol configuration information, an Autonomous System protocol (AS-protocol) may be determined for an external network in a case wherein the configuration data for an interface of a previously unconnected network segment indicates Border Gateway Protocol (BGP) peering. The AS-protocol interface of the external network may thereafter be connected to the interface of the previously unconnected network segment, for example if the AS-protocol interface does not yet exist.

In another exemplary automatic inference of configuration information, such as communication protocol configuration information, a separate AS-protocol may be determined for an external network in a case wherein the configuration data for an interface of a previously unconnected network segment indicates Virtual Routing and Forwarding (VRF). The AS-protocol interface of the external network may thereafter be connected to the interface of the previously unconnected network segment, for example if an interface is configured for VRF, then a separate AS-external network may be created if it doesn't exist and connected to the interface of the external network.

In the same or another embodiment of the present system, in a case wherein the configuration data for an interface of a previously unconnected network segment does not indicate BGP peering or VRF (e.g., Interior Gateway Protocol (IGP)), then a common IP-external network interface may be inferred, for example in a case wherein one does not exist, and connected to the interface of the IP external network. Further, if other AS-external networks exist, then the previously unconnected network segment interfaces may be connected to the other AS-external network interface.

In a manual mode of operation during the acts 240, 250 (e.g., see, FIG. 2), checkboxes (e.g., checkbox 750) may be provided in the tree view topology 740 associated with configuration information of the unconnected network segments to facilitate a manual selection (and/or deselection) of the configuration information for the external network (e.g., the configuration information that is to be supported by the external network). As should be appreciated, during act 240, one or more external networks may be created to infer connectivity between previously unconnected network segments or portions thereof. During act 250, external network configuration data, such as routing parameters (e.g., connection interface(s), protocol(s), etc.) may be configured.

In one embodiment of the present system, selection of a "Next" button 760 within the GUI 700 may return the step-wise process back to the GUI 600 with any defined external networks now listed in the portion 620. As may be readily appreciated, the user has an option in returning to the GUI 600 of creating a new external network, editing an existing external network, or proceeding to a GUI 800 illustratively depicted in FIG. 8, for example by selecting a "Next" button 660 as shown in FIG. 6. Clearly the process described herein may be performed iteratively for each external network and corresponding interface(s) until each is "sufficiently" described.

Figure 10:
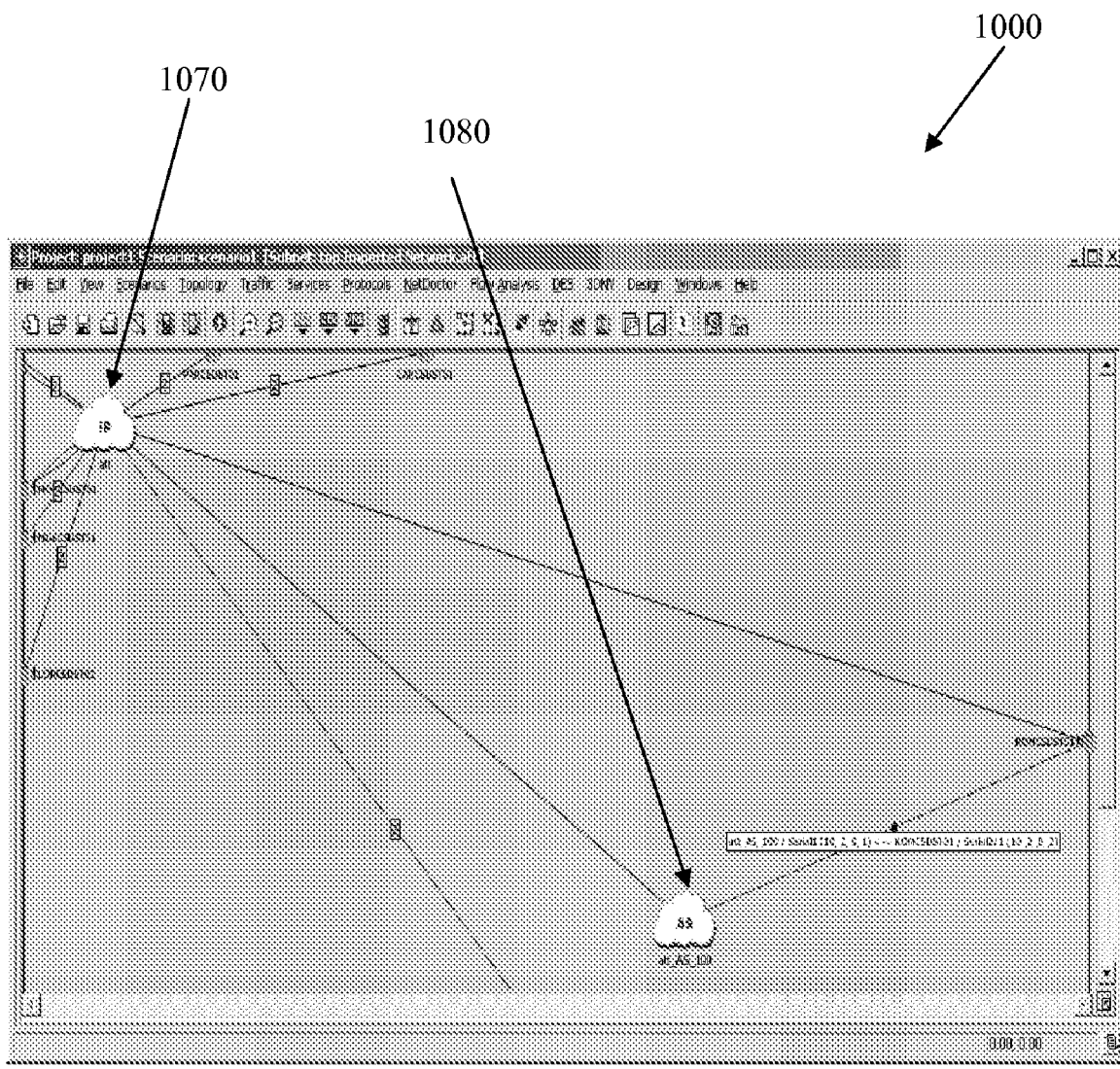
FIG. 10 shows details of an external network in accordance with an embodiment of the present system.

During act 260 of FIG. 2, in one embodiment, for each created external network, interface, etc., the routing parameters may be configured according to the parameters of the connected interfaces. Redistribution of external networks and interfaces may be enabled (e.g., automatically and/or manually) if interfaces with different IGP protocols are connected to a common external network. In an embodiment and/or configuration wherein only one external network is created, the external network may be placed directly on a common parent subnet. In a case wherein more than one external network is created, then a subnet may be created and two or more of the created external networks may be placed in this subnet. Examples of this are depicted in FIG. 10 as described below. In a case wherein further iterations are not desired, the user may decide to end the creation of the eternal network(s) data during act 270.

Figure 9:
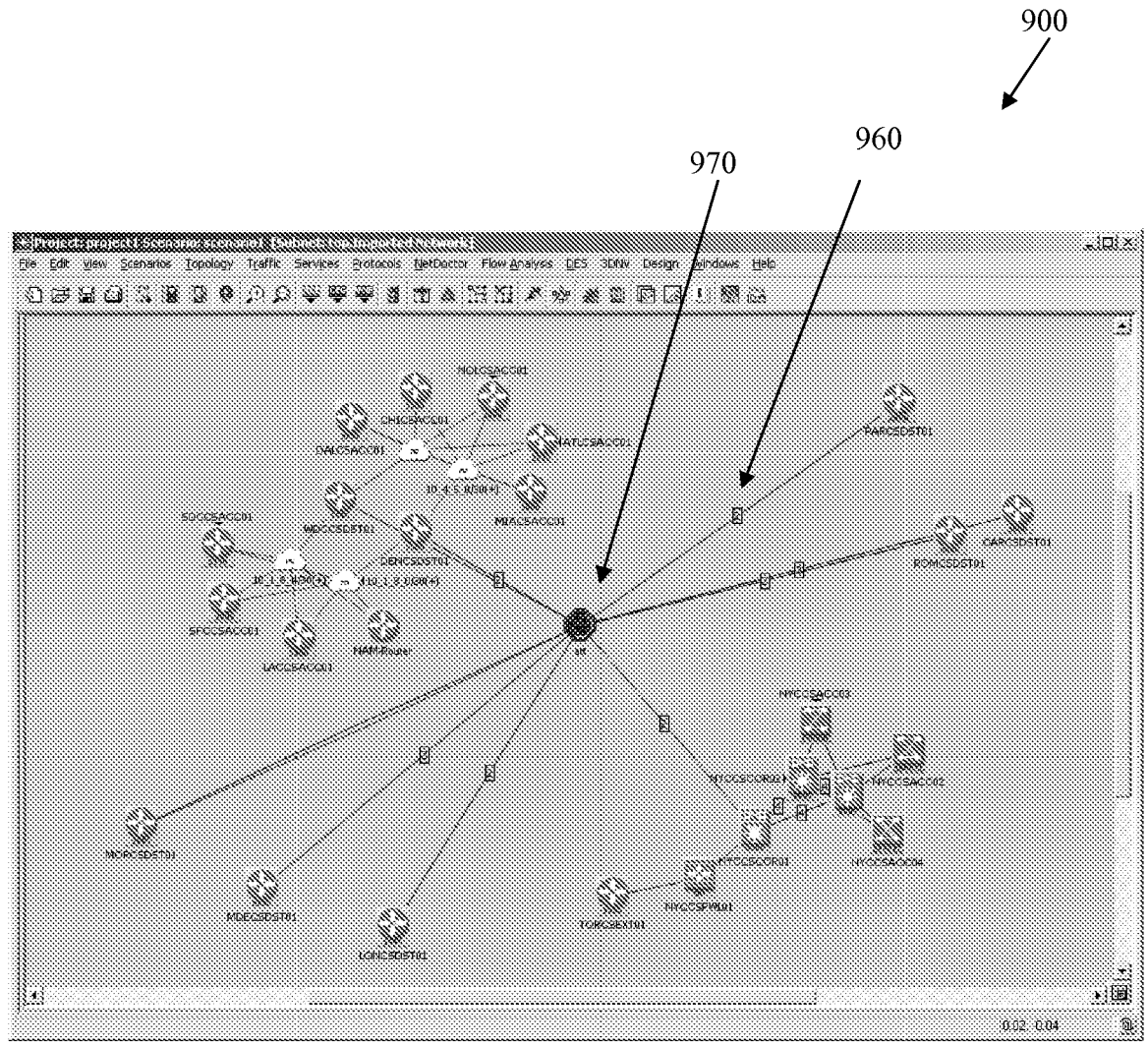
FIG. 9 shows an illustrative GUI that may be utilized for graphically reviewing network connectivity in accordance with an embodiment of the present system.

The GUI 800 provides an interface for the user to review a summary of the external networks and the configuration information (e.g., interfaces) that are associated with them. After the configuration information for the external network(s) is specified, selection of a "Finish" button 860 may exit the step-wise process. In one embodiment of the present system, after exiting the step-wise process, the user may be provided with a visualization, such as depicted in FIG. 9 including a GUI 900, of the complete network configuration including previously unconnected network segment(s) and external network(s). In another embodiment, the GUI 900 may be provided anytime during the step-wise process and/or at other designated portions within the step-wise process. In accordance with an embodiment, a default interface (e.g., IP) may be created for one or more connections between the external network(s) and the previously unconnected network segments. In accordance with a further embodiment of the present system, a given external network may be provided with two or more different interfaces to enable a connection to given previously unconnected network segment(s). Illustratively, in FIG. 9, a depiction such as boxed numbers (e.g., a boxed number 960) may be used for link bundling, such as to indicate a number of links connecting one network elements, segments, etc., to another. An iconic visualization in a form of a red octagon 970 may be utilized to depict an external network that has two or more subnets, interfaces, etc., to one or more previously unconnected network segments. In one embodiment of the GUI 900, a selection of the red octagon 970, for example by double-clicking the red octagon 970 as may be readily appreciated, may result in a depiction of a GUI 1000 as shown in FIG. 10.

FIG. 10 shows details of the external network depicted as the red octagon 970. In the depicted embodiment, the details of the external network include an IP external network portion 1070 (e.g., interface) and an AS-protocol external network portion 1080 and interconnections thereof. As may be readily appreciated, more or less details of the external network(s), unconnected network(s) and/or previously unconnected network(s) may be readily depicted as desired and/or by default.

Following operation of the present system, a complete model may be provided connecting previously unconnected network segments including related configuration data to facilitate network simulations and/or analysis. A visual review of the connected network or portions thereof may be depicted as shown in FIGS. 9 and/or 10 either at the end of creation of the elements of the connected network and/or at intermediate stages of network creation if desired. Further, external network configuration information including subnet information may be created as a result of operation of the present system and may be saved to a data file for importation and/or exportation into a further system that may perform simulations, analysis and/or modeling.

In operation and utilization of the present system, a user may specify the creation of one or more external networks (e.g., att) and may choose one or more portions of interfaces that connect to this one or more external networks. In one embodiment, the present system may create the necessary number of external networks or network subnets to make all of these connections "fit" into the att external network. In a case wherein only one (1) external network is needed, then a separate subnet need not be created. However, in a scenario wherein multiple external network portions are created, each portion may be configured as a subnet, as is shown in FIG. 10.

Figure 11:
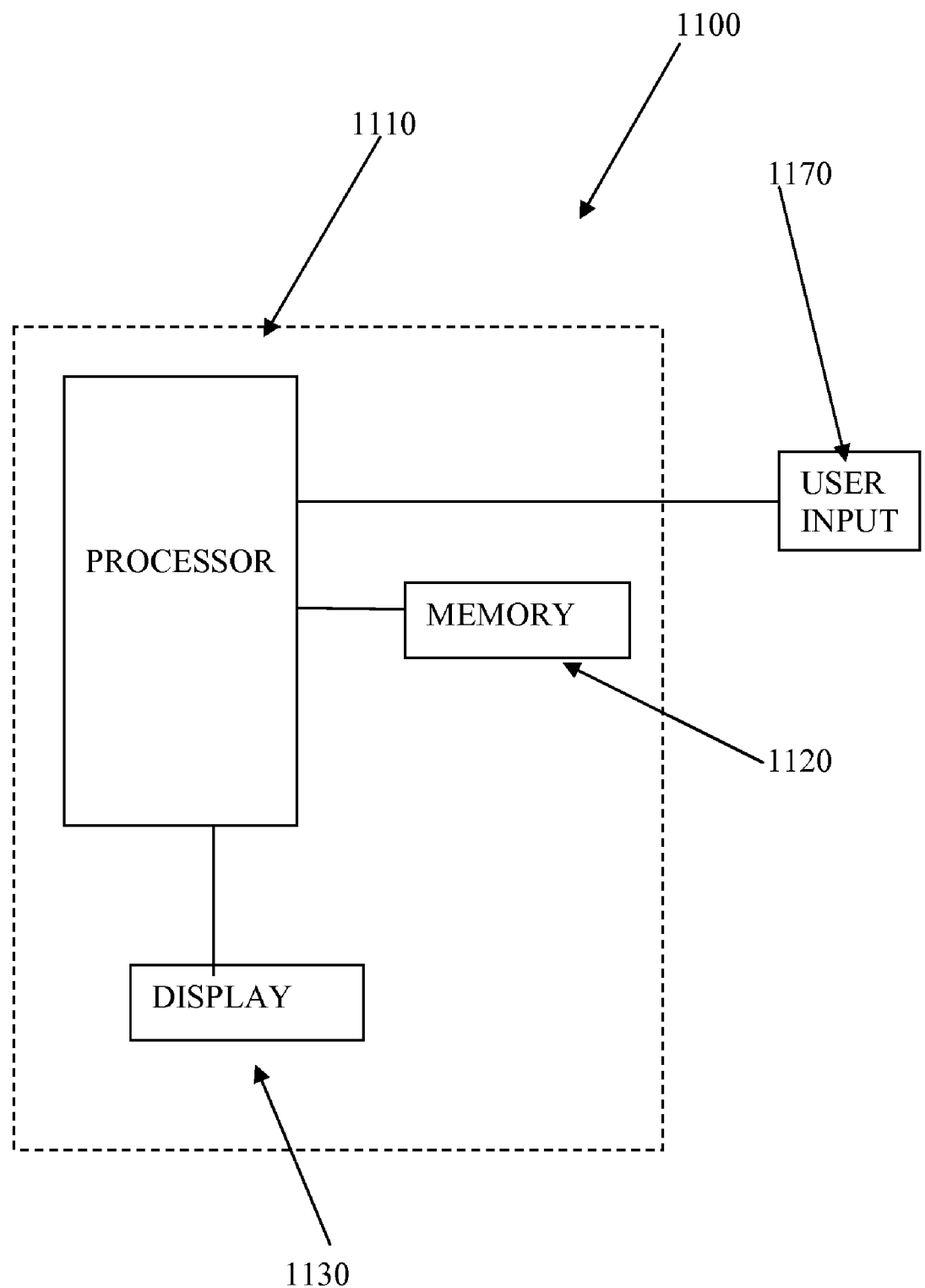
FIG. 11 shows a device in accordance with an embodiment of the present system.

FIG. 11 shows a device 1100 in accordance with an embodiment of the present system. The device has a processor 1110 operationally coupled to a memory 1120, a display 1130, and a user input device 1170. The memory 1120 may be any type of device for storing application data as well as other data, such as connection information, etc. The application data and other data are received by the processor 1110 for configuring the processor 1110 to perform operation acts in accordance with the present system. The operation acts include controlling of the display 1130 to display one or more of the UIs described herein. The user input 1170 may include a keyboard, mouse, trackball or other device(s), including touch sensitive displays, which may be stand alone or be a part of a system, such as part of a personal computer, personal digital assistant, or other display device for communicating with the processor 1110. The communication between the user input 1170 and the processor 1110 may be any type of operable link, such as a wired or wireless link. The user input device 1170 is operable to enable initiation of processing acts, such as act 210 and following acts of FIG. 2 (and others if desired) as well as enabling interaction with the acts. Clearly the processor 1110, memory 1120, display 1130 and/or user input device 1170 may all or partly be a portion of a computer system or other device, such as a network analysis system.

The methods of the present system are particularly suited to be carried out by a computer software program, such program may contain modules corresponding to the individual steps or acts of the methods. Such program may of course be embodied in a computer-readable medium, such as an integrated chip, a peripheral device (e.g., memory), such as the memory 1120 or other memory, such as a cache memory coupled to the processor 1110.

The computer-readable medium and/or memory 1120 may be any recordable medium (e.g., RAM, ROM, removable memory, CD-ROM, hard drives, DVD, floppy disks or memory cards) or may be a transmission medium (e.g., a network comprising fiber-optics, the world-wide web, cables, or a wireless channel using time-division multiple access, code-division multiple access, or other radio-frequency channel). Any medium known or developed that may store information suitable for use with a computer system may be used as the computer-readable medium and/or memory 1120.

Additional memories may also be used. The computer-readable medium (e.g., the memory 1120) and/or any other memories may be long-term, short-term, or a combination of long-term and short-term memories. These memories configure processor 1110 to implement the methods, operational acts, and functions disclosed herein. The memories may be distributed such as residing on one or more servers connected within a network or may reside local to the device 1100 and the processor 1110, where additional processors may be provided that may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 1110. With this definition, information on a network is still within memory 1120, for instance, because the processor 1110 may retrieve the information from the network for operation in accordance with the present system.

The processor 1110 is capable of providing control signals and/or performing operations in response to input signals from the user input device 1170 and executing instructions stored in the memory 1120. The processor 1110 may be an application-specific or general-use integrated circuit(s). Further, the processor 1110 may be a dedicated processor for performing in accordance with the present system or may be a general-purpose processor wherein only one of many functions operates for performing in accordance with the present system. The processor 1110 may operate utilizing a program portion, multiple program segments, or may be a hardware device utilizing a dedicated or multi-purpose integrated circuit.

As should now be apparent, the present system aids a user in connecting previously unconnected network segments to facilitate subsequent network studies, such as routing studies and traffic studies between previously unconnected network segments. The present system provides an ability to evaluate a current state of network health and/or to predict future network behavior. As may be readily appreciated, each of the above descriptions may apply to present network configurations or potential future network configurations, for example for studies related to those potential future network configurations. Of course, it is to be appreciated that any one of the above embodiments or processes may be combined with one or more other embodiments or processes or be separated into additional parts in accordance with the present system.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts or steps is intended to be required unless specifically indicated; and
i) the term "plurality of" an element includes two or more of the claimed element, and does not imply any particular range of number of elements; that is, a plurality of elements may be as few as two elements, and may include an immeasurable number of elements.

We claim:

1. A method of inferring connectivity between unconnected network segments, the method comprising:
   identifying, by a network analysis system, network segments that, based on available configuration data, are unconnected;
   examining, by the network analysis system, the configuration data related to the unconnected network segments;
   creating, by the network analysis system, an abstraction of at least one external network that is assumed to connect the unconnected network segments, the abstraction including two or more newly created interfaces and including one or more connections between these interfaces that are not directly identified in the configuration data;
   inferring, by the network analysis system, routing protocol configuration data for each of the interfaces based on protocol information in the examined configuration data; and
   rendering, by the network analysis system, the abstraction of the at least one external network.

2. The method of claim 1, wherein the rendering includes exporting the inferred routing protocol configuration data to a network model.

3. The method of claim 1, wherein the rendering includes visually depicting the inferred routing protocol configuration data.

4. The method of claim 1, wherein the rendering includes altering a network model to include one or more elements that are representative of at least a portion of the external network.

5. The method of claim 1, wherein the protocol information corresponds to one of Autonomous System (AS), Interior Gateway Protocol (IGP), Open Shortest Path First (OSPF), Enhanced Interior Gateway Routing Protocol (EIGRP), and Border Gateway Protocol (BGP) information.

6. The method of claim 1, wherein inferring the configuration data includes generating a step-wise process for interaction with a user.

7. The method of claim 6, wherein the step-wise process is arranged to prompt the user to assist in making the inference.

8. The method of claim 1, wherein inferring the configuration data includes generating a user interface (UI).

9. The method of claim 8, wherein the UI is arranged comprising a first portion related to inferring the configuration data and a second portion related to associated help and wherein each of the first and second portions are depicted simultaneously within the UI.

10. The method of claim 1, including retrieving the configuration data related to the unconnected network segments from a configuration file.

11. The method of claim 10, wherein retrieving the configuration data includes retrieving the configuration data from a network model.

12. The method of claim 1, including retrieving the configuration data related to the unconnected network segments from the unconnected network segments.

13. The method of claim 1, including inferring an Internet Protocol (IP) interface to the external network in a case wherein the configuration data for an interface of a previously unconnected network segment does not indicate one of Border Gateway Protocol (BGP) peering, Virtual Routing and Forwarding (VRF), and Interior Gateway Protocol (IGP).

14. The method of claim 13, including creating and configuring the external network based on the inferred routing protocol configuration data.

15. A non-transient computer readable medium that stores an application that is configured to cause a processing system to:
   identify, based on available configuration data, network segments that are unconnected;
   examine the configuration data related to the unconnected network segments;
   create an abstraction of at least one external network that is assumed to connect the unconnected network segments, the abstraction including two or more newly created interfaces and including connections between these interfaces that are not directly identified in the configuration data;
   infer routing protocol configuration data for each of the newly created interfaces based on protocol information in the examined configuration data; and
   render the abstraction of the at least one external network.

16. The medium of claim 15, wherein the application is configured to cause the processing system to export the inferred routing protocol configuration data to a network model.

17. The medium of claim 15, wherein the application is configured to cause the processing system to visually depict the inferred routing protocol configuration data.

18. The medium of claim 15, wherein the application is configured to cause the processing system to alter a network model to include one or more elements that are representative of at least a portion of the external network.

19. The medium of claim 15, wherein the communication protocol is one of Autonomous System (AS), Interior Gateway Protocol (IGP), Open Shortest Path First (OSPF), Enhanced Interior Gateway Routing Protocol (EIGRP), and Border Gateway Protocol (BGP).

20. The medium of claim 15, wherein the application is configured to cause the processing system to generate a step-wise process.

21. The medium of claim 20, wherein the step-wise process is arranged to prompt a user to assist in making the inference.

22. The medium of claim 15, wherein the application is configured to cause the processing system to generate a user interface.

23. The medium of claim 22, wherein the user interface is arranged comprising a first portion related to inferring the configuration data and a second portion related to associated help and the application is configured to cause the processing system to depict each of the first and second portions simultaneously within the user interface.

24. The method of claim 1, including inferring an Autonomous System (AS) protocol for the external network in a case wherein the configuration data for an interface of a previously unconnected network segment indicates at least one of Border Gateway Protocol (BGP) peering, Virtual Routing and Forwarding (VRF), and Interior Gateway Protocol (IGP).

25. The method of claim 24, including creating the external network and configuring the external network based on the inferred routing protocol configuration data.

* * * * *